US012444036B2

(12) United States Patent
Wang

(10) Patent No.: US 12,444,036 B2
(45) Date of Patent: Oct. 14, 2025

(54) BRAKE DISC WEAR DEGREE MEASURING METHOD, APPARATUS AND DEVICE

(71) Applicant: Autel Intelligent Technology Corp., Ltd., Shenzhen (CN)

(72) Inventor: Weilin Wang, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 315 days.

(21) Appl. No.: 18/256,212

(22) PCT Filed: Nov. 25, 2021

(86) PCT No.: PCT/CN2021/133076
§ 371 (c)(1),
(2) Date: Jun. 7, 2023

(87) PCT Pub. No.: WO2022/121694
PCT Pub. Date: Jun. 16, 2022

(65) Prior Publication Data
US 2024/0020815 A1 Jan. 18, 2024

(30) Foreign Application Priority Data
Dec. 11, 2020 (CN) .......................... 202011453195.7

(51) Int. Cl.
G06T 7/00 (2017.01)
G06T 7/50 (2017.01)
G06T 7/70 (2017.01)

(52) U.S. Cl.
CPC .............. G06T 7/0004 (2013.01); G06T 7/50 (2017.01); G06T 7/70 (2017.01);
(Continued)

(58) Field of Classification Search
CPC ........... G06T 7/0004; G06T 7/50; G06T 7/70; G06T 2207/10028; G06T 2207/20024; G06T 2207/30252
See application file for complete search history.

(56) References Cited

U.S. PATENT DOCUMENTS 10,282,834 B1 5/2019 Finch
2020/0130420 A1 4/2020 Puranik

FOREIGN PATENT DOCUMENTS

CN 110087913 A 8/2019
CN 110599469 A 12/2019
(Continued)

OTHER PUBLICATIONS

International Search Report of PCT Patent Application No. PCT/CN2021/133076 issued on Feb. 23, 2022.

Primary Examiner — Vu Le
Assistant Examiner — Matthew James Bodnark
(74) Attorney, Agent, or Firm — Andrew C. Cheng

(57) ABSTRACT

A brake disc wear degree measuring method comprises: obtaining a brake disc image comprising a laser pattern (110); extracting the laser pattern from the brake disc image, and generating a projection depth point cloud map according to the extracted laser pattern (120); identifying the projection depth point cloud map by means of a point cloud map identification model to obtain a matching sample, and determining a measurement feature of the matching sample as a measurement feature of the projection depth point cloud map (130); determining a position of a reference point in the projection depth point cloud map according to the measurement feature (140); determining a position of a measurement point in the projection depth point cloud map according to the measurement feature (150); and determining, according to the position of the reference point and the position of the measurement point, a difference value of the laser projection (Continued)

depths of the reference point and the measurement point, wherein the difference value is used for representing a wear degree index of a brake disc (160).

13 Claims, 7 Drawing Sheets

(52) U.S. Cl.
CPC ............... *G06T 2207/10028* (2013.01); *G06T 2207/20024* (2013.01); *G06T 2207/30252* (2013.01)

(56) References Cited

FOREIGN PATENT DOCUMENTS

| | | | | |
|---|---|---|---|---|
| CN | 111830049 A | * | 7/2020 | ............... G06T 7/50 |
| CN | 112700405 A | | 4/2021 | |

* cited by examiner

BRAKE DISC WEAR DEGREE MEASURING METHOD, APPARATUS AND DEVICE

CROSS-REFERENCE TO RELATED APPLICATIONS

The present application is the National Stage application for PCT patent application Serial No. PCT/CN2021/133076, filed on Nov. 25, 2021, which claims priority to the Chinese patent application No. 202011453195.7 entitled "brake disc wear degree measuring method, apparatus and device" filed on Dec. 11, 2020 to the China National Intellectual Property Administration, the entire contents of which are incorporated herein by reference.

TECHNICAL FIELD

The present application relates to the technical field of measurement, and particularly to a brake disc wear degree measuring method, apparatus and device.

BACKGROUND OF THE INVENTION

A brake disc is a component used for automotive braking. In the process of using a brake disc, the brake disc is subject to wear. When the wear reaches a certain degree, the brake disc needs to be replaced in time. It is therefore necessary to measure the wear condition of the brake disc.

In the related art, for a brake disc with a wear line, the wear degree of the brake disc can be obtained by directly observing the wear line; for a brake disc without a wear line, it is necessary to manually judge the wear degree of the brake disc after the tire is removed. The wear line is an identification line used on the surface of the brake disc to judge the wear degree of the brake disc. In general, the wear degree of the wear line can be used to represent the wear degree of the brake disc. However, in implementing the embodiments of the present invention, the inventors have found that the resulting brake disc wear degree index is not sufficiently accurate because the manner in which the wear line is observed or the tire removed is measured depends on manual judgment.

SUMMARY OF THE INVENTION

In view of the above problem, the embodiments of the present invention provide a brake disc wear degree measuring method, apparatus, and device for solving the problem of inaccurate measurement of brake disc wear degree in the prior art.

According to one aspect of an embodiment of the present invention, there is provided a brake disc wear degree measuring method. The method comprises:
  obtaining a brake disc image comprising a laser pattern;
  extracting the laser pattern from the brake disc image, and generating a projection depth point cloud map of the laser pattern according to extracted laser pattern;
  identifying the projection depth point cloud map by means of a point cloud map identification model to obtain a matching sample, which matches the projection depth point cloud map, in the point cloud map identification model, and determining a measurement feature of the matching sample as the measurement feature of the projection depth point cloud map, wherein the measurement feature comprises at least one of a position feature of an interference pattern and an image feature related to a measurement position;
  determining a position of a reference point in the projection depth point cloud map according to the measurement feature, wherein the reference point is located in an unworn region, and the reference point is used as an identification point of a laser projection depth of the unworn region;
  determining a position of a measurement point in the projection depth point cloud map according to the measurement feature, wherein the measurement point is located in a wear region, and the measurement point is used as an identification point of the laser projection depth of the wear region;
  and determining, according to the position of the reference point and the position of the measurement point, a difference value of the laser projection depths of the reference point and the measurement point, wherein the difference value is used for representing a wear degree index of the brake disc.

In an alternative mode, determining the position of a reference point in the projection depth point cloud map according to the measurement feature comprises:
  identifying a coordinate point with a minimum laser projection depth in the projection depth point cloud map according to the measurement feature; and
  determining identified coordinate point with the minimum laser projection depth as the reference point of the projection depth point cloud map.

In an alternative mode, determining the position of a measurement point in the projection depth point cloud map according to the measurement feature further comprises:
  determining a measurement point identification algorithm of the projection depth point cloud map according to a category of the matching sample; and
  determining the position of a measurement point in the projection depth point cloud map according to the measurement point identification algorithm of the projection depth point cloud map.

In an alternative mode, the point cloud map identification model is generated in the following way:
  acquiring multiple samples of the projection depth point cloud map and a category label for each sample of the projection depth point cloud map; and
  inputting the multiple samples of the projection depth point cloud map and the category label of each sample of the projection depth point cloud map into a neural network model for training to generate the point cloud map identification model.

In an alternative mode, the method comprises:
if the matching sample is a first-category sample, then the measurement point identification algorithm being: identifying an inflection point of a sample of the projection depth point cloud map, and determining the inflection point as the measurement point;
if the matching sample is a second-category sample, then the measurement point identification algorithm being: identifying the inflection point of a sample of the projection depth point cloud map, fitting a straight line near the inflection point according to a preset rule, and determining the measurement point according to fitted straight line;
if the matching sample is a third-category sample, then the measurement point identification algorithm being: identifying the inflection point of a sample of the projection depth point cloud map, generating a measurement line according to point cloud data within a preset range on the right side of the inflection point, and determining the measurement point according to generated measurement line;

if the matching sample is a fourth-category sample, then the measurement point identification algorithm being: identifying the inflection point and a top point of a sample of the projection depth point cloud map, and determining a first preset position on the right side of the top point as the measurement point, wherein the top point is a coordinate point with a maximum laser projection depth;

if the matching sample is a fifth-category sample, then the measurement point identification algorithm being: identifying a change point and the inflection point of a sample of the projection depth point cloud map, and determining a second preset position near the change point as the measurement point, wherein the change point is a coordinate point where the laser projection depth begins to change from large to small in the wear region; and if the matching sample is a sixth-category sample, then the measurement point identification algorithm being: identifying the inflection point on a left side of a sample of the projection depth point cloud map, and determining the inflection point on the left side as the measurement point;

wherein the inflection point is a coordinate point at a position where a preset change occurs in the curvature of a sample of the projection depth point cloud map.

In an alternative mode, the interference pattern comprises a virtual region, the virtual region being an abnormal region on the projection depth point cloud map, and after a step of determining the measurement feature of the matching sample as the measurement feature of the projection depth point cloud map, the method further comprises:

detecting whether the virtual region exists in the projection depth point cloud map according to the measurement feature; wherein if it is detected that the virtual region exists, a preset replacement algorithm is used to replace a coordinate value of the virtual region, so that the virtual region does not exist on the projection depth point cloud map after a replacement, and then steps of determining a position of a reference point in the projection depth point cloud map according to the measurement feature and determining a position of a measurement point in the projection depth point cloud map according to the measurement feature are executed.

In an alternative mode, the image feature relating to measurement position comprises an inclination, and after a step of determining a measurement feature of the matching sample as a measurement feature of the projection depth point cloud map, the method further comprises:

detecting whether the projection depth point cloud map is inclined according to the measurement feature;

wherein if it is detected that the projection depth point cloud map is inclined, a rotation transformation is performed on the projection depth point cloud map so that the projection depth point cloud map which has undergone the rotation transformation is no longer inclined, and then steps of determining a position of a reference point in the projection depth point cloud map according to the measurement feature and determining a position of a measurement point in the projection depth point cloud map according to the measurement feature are executed.

In an alternative mode, the interference pattern comprises a background region, the background region being a region where point cloud data of the background outside the brake disc is located, and after a step of determining a measurement feature of the matching sample as the measurement feature of the projection depth point cloud map, the method further comprises:

detecting whether a background region exists in the projection depth point cloud map according to the measurement feature;

wherein if it is detected that a background region exists in the projection depth point cloud map, a preset filtering algorithm is used to filter the background region so as to eliminate the interference of the background region, and then steps of determining a position of a reference point in the projection depth point cloud map according to the measurement feature and determining a position of a measurement point in the projection depth point cloud map according to the measurement feature are executed.

In an alternative mode, the interference pattern comprises a framework region, the framework region being a region where point cloud data of a framework of the brake disc is located on the projection depth point cloud map, and after a step of determining a measurement feature of the matching sample as the measurement feature of the projection depth point cloud map, the method further comprises:

identifying the framework region in the projection depth point cloud map according to the measurement feature, and then executing steps of determining a position of a reference point in the projection depth point cloud map according to the measurement feature and determining a position of a measurement point in the projection depth point cloud map according to the measurement feature.

In an alternative mode, the determining the position of a reference point in the projection depth point cloud map according to the measurement feature comprises:

performing a point cloud consistency analysis on the projection depth point cloud map according to the measurement feature to determine the position of the reference point in the projection depth point cloud map, wherein the projection depth point cloud map corresponds to one wear edge of the brake disc, and the point cloud consistency analysis comprises a discreteness analysis of a coordinate point set of a wear region and curvature analysis of the projection depth point cloud map.

In an alternative mode, the method further comprises:

determining wear consistency of the brake disc based on a variance of all point cloud coordinates of a wear region in the projection depth point cloud map and a wear region curvature of the projection depth point cloud map, wherein the wear consistency is used for representing a wear degree index of the brake disc.

According to another aspect of an embodiment of the present invention, there is provided a brake disc wear degree measurement apparatus. The apparatus comprises:

an acquisition module for obtaining a brake disc image comprising a laser pattern;

a generation module for extracting the laser pattern from the brake disc image, and generating a projection depth point cloud map of the laser pattern according to extracted laser pattern;

a first determination module for identifying the projection depth point cloud map by means of a point cloud map identification model to obtain a matching sample, which matches the projection depth point cloud map, in the point cloud map identification model, and determining a measurement feature of the matching sample as a measurement feature of the projection depth point cloud map, wherein the measurement feature comprises at least one of a position feature of an interference pattern and an image feature related to a measurement position;

a second determination module for determining a position of a reference point in the projection depth point cloud map according to the measurement feature, wherein the reference point is located in an unworn region, and the reference point is used as an identification point of a laser projection depth of the unworn region;

a third determination module for determining the position of a measurement point in the projection depth point cloud map according to the measurement feature, wherein the measurement point is located in a wear region, and the measurement point is used as the identification point of the laser projection depth of the wear region;

and a fourth determination module for determining, according to the position of the reference point and the position of the measurement point, a difference value of the laser projection depths of the reference point and the measurement point, wherein the difference value is used as an index for representing wear degree of the brake disc.

According to another aspect of an embodiment of the present invention, there is provided a brake disc wear degree measurement device. The device comprises: a laser, a camera, and a host;

wherein the laser is used for projecting laser light to the brake disc;

the camera is used for acquiring a brake disc image containing a laser pattern, wherein after the laser light is projected onto the brake disc, the brake disc presents the laser pattern, the host is used for executing the brake disc wear degree measurement method mentioned above.

According to yet another aspect of an embodiment of the present invention, there is provided a computer-readable storage medium. At least one executable instruction is stored in the storage medium, and when the executable instruction runs on a brake disc wear degree measurement device, the brake disc wear degree measurement device executes an operation of the brake disc wear degree measurement method mentioned above.

After acquiring a brake disc image containing a laser pattern, an embodiment of the present invention can extract the laser pattern from the brake disc image, and generate a projection depth point cloud map of the laser pattern according to the extracted laser pattern; further determine a matching sample matched with the projection depth point cloud map in the point cloud map identification model, determine the position of the reference point and the position of the measurement point in the projection depth point cloud map through the measurement feature of the matching sample, and according to the position of the reference point and the position of the measurement point, determine the difference values between the laser projection depths of the reference point and the measurement point, wherein the difference value is used for representing the wear degree index of the brake disc. It can be seen that the embodiments of the present invention can generate a projection depth point cloud map according to the brake disc image, and obtain a wear degree index of the brake disc according to the projection depth point cloud map, thereby improving the accuracy of the wear degree measurement compared with a manual judgement mode.

The above description is only an overview of the technical schemes of the embodiments of the invention. In order to understand the technical means of the embodiments of the invention more clearly, it can be implemented according to the contents of the description. In order to make the above and other purposes, features, and advantages of the embodiments of the invention more obvious and understandable, specific implementation modes of the invention are listed below.

BRIEF DESCRIPTION OF DRAWINGS

The drawings are only for the purpose of illustrating the implementation modes and are not to be construed as limiting the present invention. Moreover, like reference numerals denote like components throughout the drawings. In the drawings.

DETAILED DESCRIPTION OF THE INVENTION

Hereinafter, exemplary embodiments of the present invention will be described in more detail with reference to the accompanying drawings. While the drawings show exemplary embodiments of the invention, it should be understood that the invention may be implemented in various forms and should not be limited by the embodiments described herein.

Figure 1:
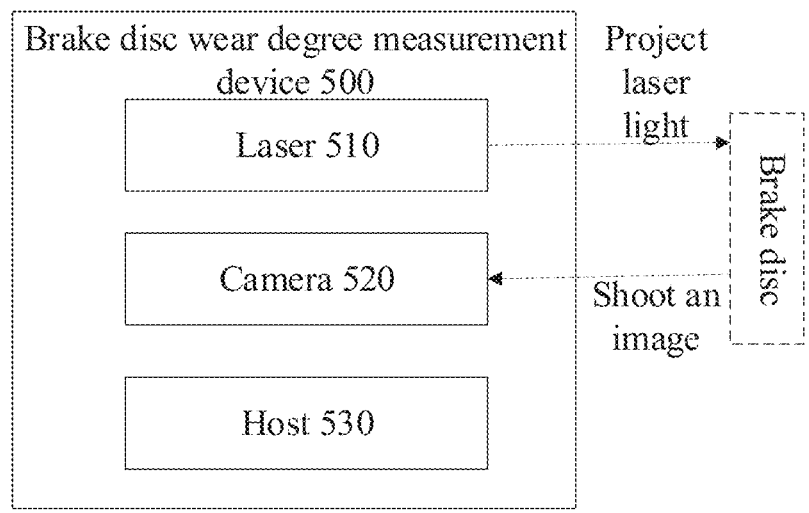
FIG. 1 shows a schematic structural diagram of a brake disc wear degree measurement device provided by an embodiment of the invention.

FIG. 1 shows a schematic structural diagram of a brake disc wear degree measurement device provided by an embodiment of the present invention; As shown in FIG. 1, the apparatus 500 includes: a laser 510, a camera 520, and a host 530.

The laser 510 is used for projecting laser light to the brake disc;

the camera 520 is used for acquiring a brake disc image containing a laser pattern, wherein after the laser light is projected onto the brake disc, the brake disc presents the laser pattern;

the host 530 is used to make brake disc wear degree measurements.

In a preferred implementation mode of an embodiment of the invention, the device 500 may further comprise: a display system, a battery, and a body. The display system is used for displaying the wear degree index of the brake disc measured by the display device, the battery is used for supplying power to the device, and the body is used as a support shell of the device. A base may be provided on the body, and the base may provide a supporting function when the device measures the wear degree of the brake disc.

The device 500 may be hand-held or non-hand-held, depending on the shape of the body. When the device 500 is used to measure the wear degree of a brake disc, the device 500 can be extended into a rim to measure the brake disc, and brake discs of different types and wear situations can be measured at multiple measurement positions, thereby avoiding errors caused by the disassembly of a tire or manual judgment.

The brake disc wear degree measurement device in an embodiment of the present invention can generate a projection depth point cloud map according to the brake disc image, and obtain a wear degree index of the brake disc according to the projection depth point cloud map, so that the wear degree of the brake disc can be accurately measured. Hereinafter, the process of measuring the wear degree of the brake disc by the host will be described in detail.

Figure 2:
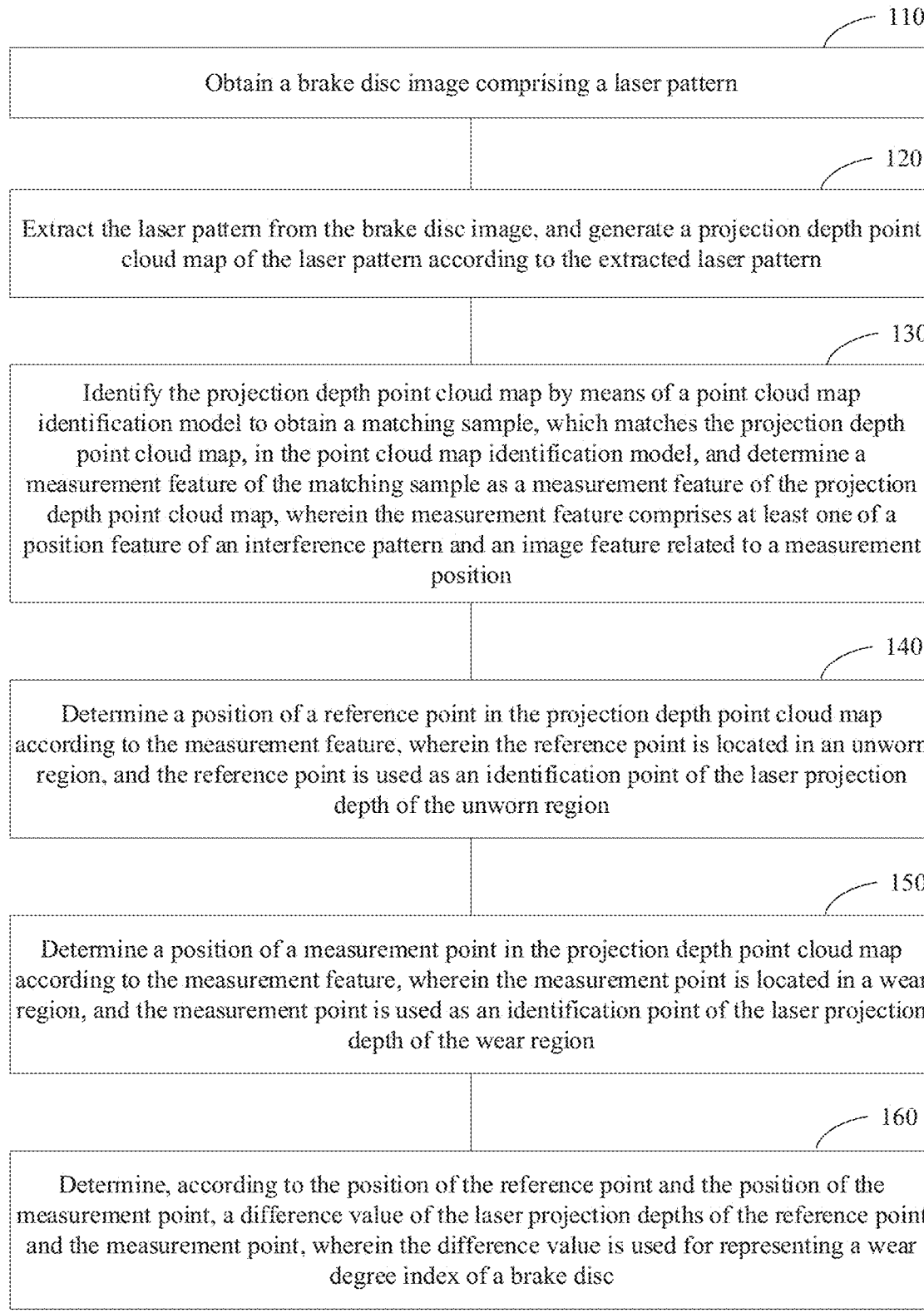
FIG. 2 shows a schematic flow diagram of a brake disc wear degree measurement method provided by an embodiment of the present invention.

FIG. 2 shows a schematic flow diagram of a brake disc wear degree measurement method provided by an embodiment of the present invention. The method is executed by the host. In an embodiment of the invention, the storage space of the host stores therein an executable instruction that enables a processor of the host to execute a brake disc wear degree measurement method. As shown in FIG. 2, the process comprises the steps:

step 110, obtaining a brake disc image comprising a laser pattern;

wherein the brake disc image containing a laser pattern can be shot by a camera and transmitted to a host, and the host acquires the brake disc image shot by the camera. Before the brake disc image containing the laser pattern is shot by the camera, the host may send a control command to the laser so that the laser projects laser light to the brake disc according to the control command, and after the laser light is projected onto the brake disc, the laser pattern is presented on the brake disc.

The laser may be, for example, a line laser capable of projecting a line laser light, in which case the laser pattern is a laser ray. After receiving the control command, the laser can project laser light to the brake disc according to the control command, and the projection direction of the laser is adjusted so that the laser light projected by the laser can be perpendicular to the surface of the brake disc; it is also possible to select multiple measuring positions on the surface of the brake disc, and to measure the wear degree at each position by making the projected laser lights traverse the surface of the brake disc respectively at each measurement position.

Step 120, extract the laser pattern from the brake disc image, and generate a projection depth point cloud map of the laser pattern according to the extracted laser pattern.

The pixel coordinates of the laser pattern can be obtained according to the brake disc image, camera coordinates (Xc, Yc, Zc) are obtained by performing projection transformation on the pixel coordinates (u, v) of the laser pattern, and laser coordinates (xL, yL, zL) are obtained by performing rotation transformation on the camera coordinates (Xc, Yc, Zc), which is equivalent to obtaining a projection depth point cloud map of the laser pattern. The pixel coordinate system is a coordinate system established for determining the pixel position of the laser pattern in the brake disc image; a camera coordinate system is a coordinate system established by taking a camera as a central point and taking a photographing direction of the camera as a Zc axis; the laser coordinate system is a coordinate system established by taking the origin of camera coordinate system as the coordinate origin, taking the laser projection direction as the yL axis, and taking the normal vector of the light knife plane of the laser light as the zL axis. In the laser coordinates (xL, yL, zL), xL is the laser ray direction (i.e. the direction of the laser ray on the surface of the brake disc), yL is the projection direction of the line laser, and zL is the normal vector of the light knife plane of the laser light.

When measuring the wear degree of the brake disc, only the projection distance of the laser light in the yL axis direction is analyzed, the data in the zL axis direction is ignored, and only the data in the zL axis direction is used to participate in the rotation transformation operation between the camera coordinate system and the laser coordinate system.

When performing projection transformation, the following formula can be used, where A is an internal parameter matrix of the camera.

$$z_c \begin{bmatrix} u \\ v \\ 1 \end{bmatrix} = A^* \begin{bmatrix} x_c \\ y_c \\ z_c \end{bmatrix}, \begin{bmatrix} x_c \\ y_c \\ z_c \end{bmatrix} = z_c A^{-1*} \begin{bmatrix} u \\ v \\ 1 \end{bmatrix}$$

In performing the rotation transformation, the following formula can be adopted, where R is a rotation matrix.

$$\begin{bmatrix} x_c \\ y_c \\ z_c \end{bmatrix} = R^* \begin{bmatrix} x_L \\ y_L \\ z_L \end{bmatrix}, \begin{bmatrix} x_L \\ y_L \\ z_L \end{bmatrix} = R^{-1*} \begin{bmatrix} x_c \\ y_c \\ z_c \end{bmatrix}$$

In the process of obtaining the projection depth point cloud map of the laser pattern by using the laser triangular ranging method, the laser and the camera are mounted on the same axis, and are separated by a preset distance; the direction of the laser ray projected by the laser and the direction of the optical axis of the camera form a certain included angle (for example, 25-30 degrees); the projection depth point cloud map of the laser pattern can be obtained according to different corresponding pixel coordinates of the laser pattern on the brake disc image.

After the projection depth point cloud map of the laser pattern is generated, the projection depth point cloud map can be subjected to image processing, so that the projection depth point cloud map after the image processing can better reflect the wear degree of the brake disc.

In practice applications, a brake disc generally comprises multiple types, i.e. the surface of the brake disc has a specific pattern. For example, some brake discs have wear indicator lines, some brake discs have heat dissipation holes, and some brake discs have threads. In order to effectively measure the wear degree of the brake disc, it is generally required that the base of the brake disc wear degree measurement device is close to the surface of the brake disc, so that the projection direction of the laser ray is perpendicular to the direction of the wheel axle. The point cloud coordinates of the corresponding local region of the special pattern of the surface of the brake disc in the projection depth point cloud map are generally abruptly enlarged or fractured, and the point cloud coordinates abruptly enlarged or fractured are generally distributed in the range of about 4 mm. The region where the point cloud coordinates on the projection depth point cloud map abruptly enlarge or break is generally referred to as a virtual region, namely, the coordinate values of the point cloud in the virtual region are not the real coordinate values of the wear region of the brake disc, but virtual values. The coordinate value of a point cloud within the range of the virtual region changes abruptly. Within the range of the virtual region, the point cloud coordinate has a maximum value for the abrupt change, which is generally located near the center of the virtual region. The virtual region can be identified and processed according to the feature that the maximum value of the abrupt change is generally located near the center of the virtual region, so that the projection depth point cloud map after processing the virtual region can better reflect the wear degree of the brake disc.

Step 130: identify the projection depth point cloud map by means of a point cloud map identification model to obtain a matching sample, which matches the projection depth point cloud map, in the point cloud map identification model, and determine a measurement feature of the matching sample as a measurement feature of the projection depth point cloud map, wherein the measurement feature comprises at least one of a position feature of an interference pattern and an image feature related to a measurement position.

The point cloud map identification model may be, for example, a kind of neural network model capable of identifying the category of the projection depth point cloud map. A kind of neural network model may be selected and the selected neural network model may be trained to generate a point cloud map identification model before executing the step of identifying the projection depth point cloud map through the point cloud map identification model. In a kind of preferred implementation mode of an embodiment of the present invention, multiple samples of the projection depth point cloud map and a category label of each sample of the projection depth point cloud map may be acquired, and the multiple samples of the projection depth point cloud map and the category label of each sample of the projection depth point cloud map are input into a neural network model for training to generate a point cloud map identification model.

The interference pattern may comprise a virtual region, and the virtual region is an abnormal region on the projection depth point cloud map. In order to eliminate the influence of the virtual region on the brake disc wear degree measurement, in a preferred implementation mode of an embodiment of the invention, after step 130, an embodiment of the invention may further comprise:

Step 131: detect whether there is a virtual region in the projection depth point cloud map according to the measurement feature, wherein if it is detected that there is a virtual region, a preset replacement algorithm is used to replace a coordinate value of the virtual region, so that there is no virtual region on the replaced projection depth point cloud map.

The virtual region may comprise a fracture region and an abrupt change region on a projection depth point cloud map. The fracture region is a section of a region where the point cloud coordinate is a null value, and the abrupt change region is a section of a region where the point cloud coordinate abruptly increases or abruptly decreases. The preset replacement algorithm may include multiple kinds, and the preset replacement algorithm may include, for example, a boundary value replacement algorithm, a linear interpolation replacement algorithm, a quadratic curve fitting replacement algorithm, etc.

The boundary value replacement algorithm replaces the point cloud coordinate value of the virtual region with the coordinate value at the boundary of the virtual region. When replacing the point cloud coordinate value of the virtual region with the coordinate value at the boundary of the virtual region, the validity of the coordinate values at the two boundaries of the virtual region can be judged first; if it is judged that the coordinate values at the two boundaries of the virtual region are both valid, and the coordinate values at the two boundaries are not significantly different, then the average value of the coordinate values at the two boundaries are taken as the point cloud coordinate value of the virtual region; if the coordinate at one of the boundaries is relatively large, e.g. the coordinate value at one boundary being larger than the coordinate value at the other boundary by 0.1 mm, the larger of the coordinate values at the two boundaries is taken as the point cloud coordinate value of the virtual region.

The linear interpolation replacement algorithm uses the coordinate values at the two boundaries of the virtual region to calculate the point cloud coordinate value of the virtual region. The coordinate values at two boundaries of the virtual region can refer to the determination mode in the above boundary value replacement algorithm. The linear interpolation replacement algorithm may be, for example;

$$y=(1-r)*y1+r*y2$$

$$r=(x-x1)/(x2-x1)$$

where (x1, y1) and (x2, y2) are coordinate values at two boundaries respectively, x is a point cloud coordinate xL value of a virtual region, y is a point cloud coordinate yL value of a virtual region, and r is an interpolation coefficient.

The quadratic curve fitting replacement algorithm is to fit a quadratic function reference line according to the coordinate sequence of a point in the wear region, and replace the point cloud coordinate value of the virtual region with the calculated value of the fitted quadratic function. When using the quadratic curve fitting replacement algorithm, we can first find a coordinate point with good consistency in the wear region, use the least square method to perform fitting, and calculate the parameters a, b, c in $y=ax^2+bx+c$, so as to calculate the equation of the fitted quadratic curve, and replace the coordinate value of the virtual region with the coordinate value of the corresponding position of the quadratic curve equation.

Figure 3:
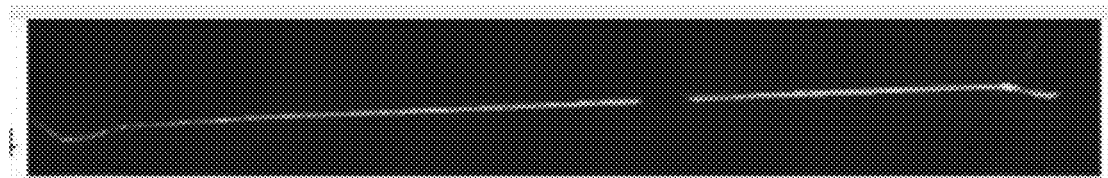
FIG. 3 and FIG. 4 show schematic diagrams of a laser pattern provided by an embodiment of the present invention.

In practical applications, the base of the brake disc wear degree measurement device needs to be attached to the surface of the brake disc so that the projection depth point cloud map is parallel to the xL axis. However, since the space between the rim and the brake disc is generally small, when the user conducts the measurement, the base does not necessarily attach completely on the brake disc surface, which makes the projection depth point cloud map may no longer be parallel to the xL axis, as shown in FIG. 3. In order to make the projection depth point cloud map parallel to the xL axis and make the wear degree measurement of the brake disc more accurate, the projection depth point cloud map can be subjected to rotation transformation, so that the projection depth point cloud map after the rotation transformation can better reflect the wear degree of the brake disc. The algorithm for performing the rotation transformation may, for example, adopt an algorithm for supporting the tilt of the projection depth point cloud map with a 360 degrees inclination angle of no more than a range of 10 degrees.

The image feature relating to the measurement position comprises tilting. In order to eliminate the influence of the tilt of the projection depth point cloud map on the brake disc wear degree measurement, in a preferred implementation mode of an embodiment of the invention, after step 130, an embodiment of the invention may further comprise:

Step 132: detect whether the projection depth point cloud map is inclined according to the measurement feature, wherein if it is detected that the projection depth point cloud map is inclined, rotation transformation is performed on the projection depth point cloud map so that the projection depth point cloud map which has undergone the rotation transformation is no longer inclined.

Figure 4:
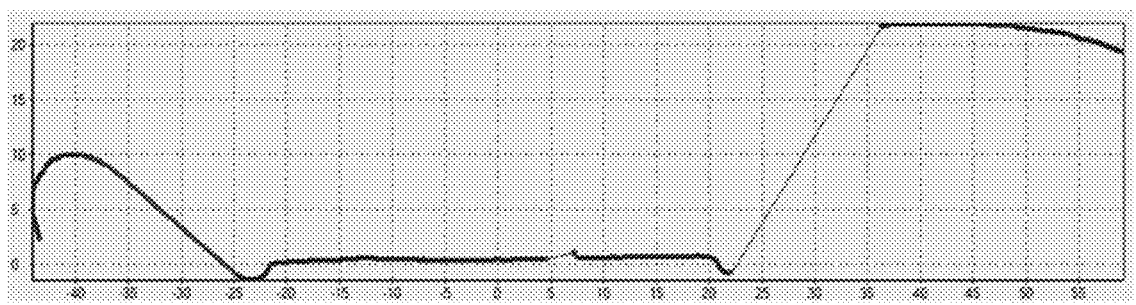

In practical applications, a brake disc image generally comprises a brake disc and a region outside the brake disc, the latter being a background region of the brake disc. The corresponding point cloud data of the background region of the brake disc on the projection depth point cloud map may cause interference with the brake disc wear degree measurement, as shown in FIG. 4. In order to accurately measure the wear region of the brake disc, it is necessary to filter the point cloud data of the background region, i.e. it is necessary to eliminate the interference of the point cloud data of the background region on the wear degree measurement of the brake disc.

The interference pattern comprises a background region. In order to eliminate the influence of the background region of the projection depth point cloud map on the brake disc wear degree measurement, in a preferred implementation mode of an embodiment of the invention, after step 130, an embodiment of the invention may further comprise:

Step 133; detect whether a background region exists in the projection depth point cloud map according to the measurement feature, wherein the background region is a region where point cloud data of a background outside the brake disc is located; if it is detected that a background region exists in the projection depth point cloud map, a preset filtering algorithm is used to filter the background region so as to eliminate the interference of the background region.

The preset filtering algorithm may comprise a distance determination filtering algorithm, a boundary point identification filtering algorithm, and a sorting filtering algorithm. The distance determination filtering algorithm filters the background region data according to the feature that the distance between the background region point cloud data and the brake disc surface point cloud data is relatively large; the boundary point identification filtering algorithm is to, according to the feature that the reference point is generally located at the lowest point of the point cloud data, find the boundary point firstly, cut off the points on the outer side of the boundary point, and only keep the points on the inner side of the boundary point. The boundary point is generally located between the reference point and the edge, for example, the boundary point being generally located at a position 2 mm away from the reference point and close to one side of the edge. The sorting filtering algorithm filters the background region according to the feature that the coordinate order of the points in the background region is inconsistent with the coordinate order of the point cloud data.

Figure 5:
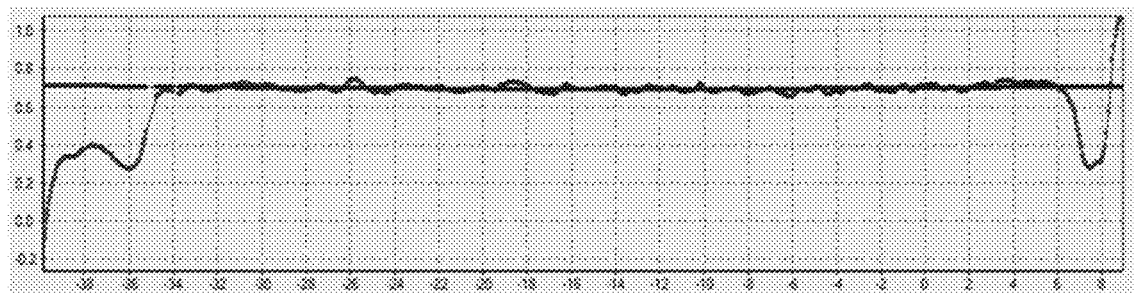
FIG. 5 to FIG. 16 show schematic diagrams of a projection depth point cloud map provided by an embodiment of the present invention.
Figure 6:
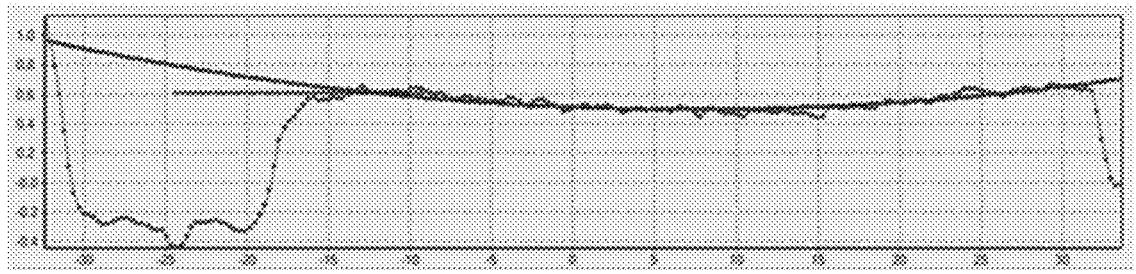
Figure 7:
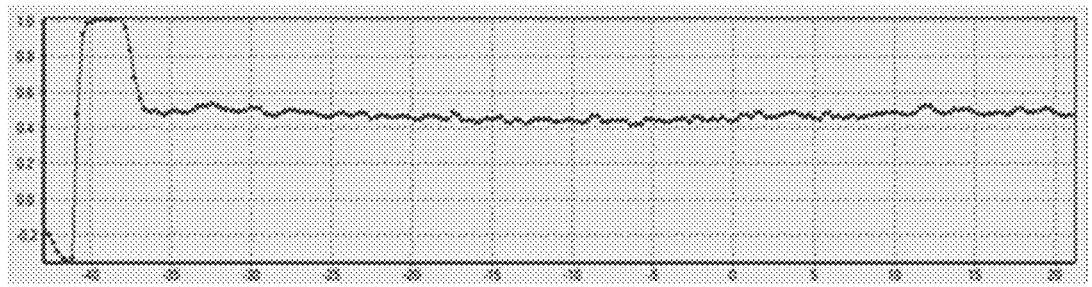

The interference pattern comprises a framework region. In practical applications, the edge of the outer side of the brake disc is mounted with other components, i.e. a framework of the brake disc. The plane of the framework is almost parallel to the unworn region of the brake disc. The framework of the brake disc corresponds to a framework region on the projection depth point cloud map, and as shown in the projection depth point cloud map of FIGS. 5-7, the framework region is included. In order to accurately measure the wear degree of the brake disc, the framework region on the projection depth point cloud map can be identified to avoid the interference of the framework region on the wear degree measurement of the brake disc. The framework region can be identified according to a preset rule, for example, the case where the change rate of the yL coordinate at the inflection point on the left side of FIG. 7 is too large, which does not comply with the rule that the wear region of the brake disc is an arc; after a certain range on the right side of the point cloud coordinate where the abrupt change occurs in FIG. 7, the wear region decreases in a large area, and the framework region near the inflection point can be judged according to the feature. In order to eliminate the influence of the framework of the brake disc on the wear degree measurement of the brake disc, the framework region on the projection depth point cloud map can be identified, and then the wear degree of the brake disc is measured. In a preferred implementation mode of an embodiment of the present invention, after step 130, an embodiment of the present invention may further comprise:

step 134: identifying a framework region in the projection depth point cloud map according to the measurement feature, wherein the framework region is a region where point cloud data of a framework of the brake disc is located on the projection depth point cloud map.

The framework region in the projection depth point cloud map can be identified by means of machine learning, and the wear degree of the brake disc can be measured. Further, machine learning may be performed on multiple samples of the projection depth point cloud map and a framework region of each sample of the projection depth point cloud map to generate a framework region identification model. The framework region in the projection depth point cloud map is identified by the generated framework region identification model.

It could be understood that the present invention does not limit the order in which steps 131-134 are executed, and that steps 131-134 described above may be executed in any order.

Step 140: determine a position of a reference point in the projection depth point cloud map according to the measurement feature, wherein the reference point is located in an unworn region, and the reference point is used as an identification point of a laser projection depth of the unworn region.

The projection depth point cloud map comprises a wear region and an unworn region on the brake disc, and may also comprise a region outside the brake disc. In order to measure the wear degree of the brake disc, it is necessary to determine a reference point in the unworn region of the brake disc for identifying the laser projection depth of the unworn region, and the laser projection depth of the unworn region can be determined by determining the position of the reference point in the projection depth point cloud map.

In a preferred implementation mode of an embodiment of the present invention, a coordinate point with the minimum laser projection depth in a projection depth point cloud map can be identified according to a measurement feature; the coordinate point with the minimum laser projection depth identified is determined as the reference point of the projection depth point cloud map. For example, in FIGS. 3 to 16, the longitudinal direction is the yL coordinate axis, the upward direction is the direction in which the yL coordinate increases, and the downward direction is the direction in which the yL coordinate decreases. The transverse direction is the xL coordinate axis, to the left is the direction in which the xL coordinate decreases, and to the right is the direction in which the xL coordinate increases. The larger the yL coordinate is, which represents the deeper the laser projection depth, i.e. the deeper the wear is, and the point with the smallest yL coordinate is the reference point. Of course, if the smaller the yL coordinate is in the generated projection depth point cloud map, it represents the deeper the laser projection depth is, i.e. the deeper the wear is, then the point with the largest yL coordinate is the reference point.

Figure 8:
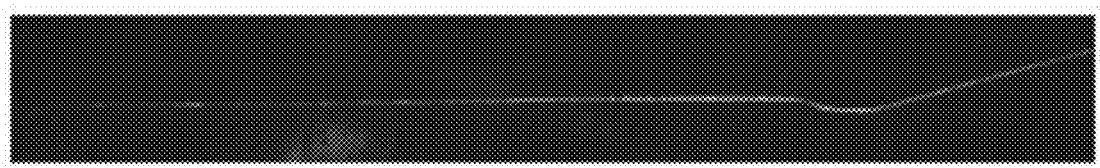

In practical applications, both edges of the brake disc are generally subjected to wear, so that the laser ray can be made to traverse both wear edges of the brake disc at the same time. Therefore, both wear edges of the brake disc can be measured at the same time. However, due to the limitation of the measurement space or the relatively wide brake disc, the laser ray can only be projected to one edge of the brake disc at a time. This measurement mode is to project the laser ray to one edge of the brake disc at a time, namely, single-sided measurement, and the projection depth point cloud map as shown in FIG. 8 is obtained by the single-sided measurement mode. In the single-sided measurement mode, the reference point of the projection depth point cloud map is generally located at the edge of the projection depth point cloud map. In a preferred implementation mode of an embodiment of the present invention, when the projection depth point cloud map corresponds to one wear edge of the brake disc, a point cloud consistency analysis may be performed on the projection depth point cloud map according to the measurement feature to determine the position of the reference point in the projection depth point cloud. The point cloud consistency analysis includes a discreteness analysis of the coordinate point set of the wear region and curvature analysis of the projection depth point cloud map. Furthermore, one straight line can be fitted in the coordinate point set of the wear region by using the least square method, so that the coordinate point set of the wear region is distributed near the fitted straight line, and the projection depth point cloud map is rotated to be parallel to the fitted straight line, and then the coordinate point located at the lowest side of the straight line is the reference point.

In a preferred implementation mode of an embodiment of the present invention, one reference line can be fitted on the projection depth point cloud map according to the point cloud data, the lowest point of a local region below the reference line is determined as the reference point, and the local region is generally a groove region on the projection depth point cloud map. Further, the local region may be identified according to the width of the local region. The local region is, for example, 5 mm. Therefore, a groove larger than 5 mm and smaller than 5 mm is not identified as a local region. The fitted reference line may be a quadratic curve or a cubic curve.

Step 150, determine a position of a measurement point in the projection depth point cloud map according to the measurement feature, wherein the measurement point is located in a wear region, and the measurement point is used as an identification point of the laser projection depth of the wear region.

In order to identify the laser light projection depth of the wear region on the projection depth point cloud map, a measurement point can be determined in the wear region, and the laser projection depth of the wear region is represented by the laser projection depth of the measurement point.

Since the shapes of the brake disc are various, the wear degrees of brake wear also have a tremendous difference. Therefore, the positions of the measurement point are different according to the different types of projection depth point cloud maps. When the measurement point is determined, the type of projection depth point cloud map can be determined first, and then the position of the measurement point can be calculated according to the measurement point identification algorithm defined by different types of projection depth point cloud maps. The neural network identification model of the projection depth point cloud map can be trained by samples, and the corresponding measurement point identification algorithm for different types of projection depth point cloud maps can be determined in advance. In the actual measurement, the type of projection depth point cloud map can be identified by the trained neural network model, and the corresponding measurement point identification algorithm is matched according to the identified projection depth point cloud map type.

In a preferred implementation mode of an embodiment of the invention, step 150 may further comprise:

step 152: determining a measurement point identification algorithm of the projection depth point cloud map according to the category of the matching sample.

The measurement point identification algorithms corresponding to different categories of the projection depth point cloud map are different. When the category of the projection depth point cloud map is determined, a corresponding measurement point identification algorithm can be determined according to the category of the projection depth point cloud map, and then the measurement point of the projection depth point cloud map is determined according to the determined corresponding measurement point identification algorithm.

In a preferred implementation mode of an embodiment of the invention, the categories of matching samples may comprise at least: the first-category sample, the second-category sample, the third-category sample, the fourth-category sample, the fifth-category sample, and the sixth-category sample.

Figure 9:
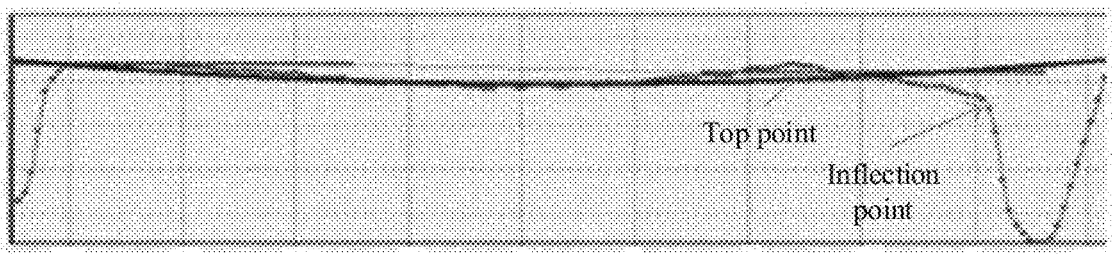
Figure 10:
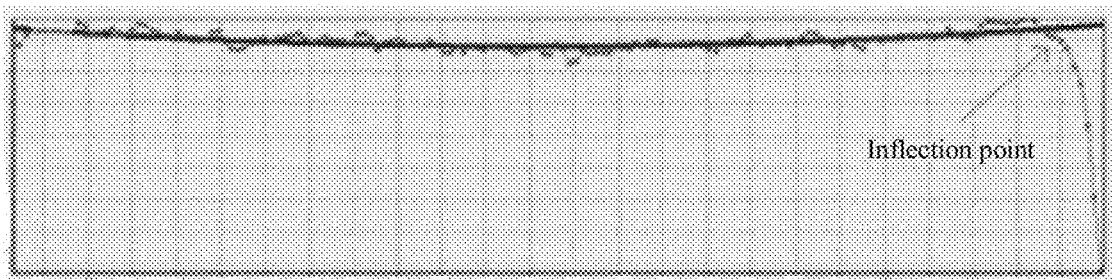

If the matching sample is the first-category sample, as shown in FIGS. 9 and 10, the measurement point identification algorithm may be, for example: identifying an inflection point of a sample of the projection depth point cloud map, and determining the inflection point as the measurement point; the inflection point being a coordinate point of a position where a preset change occurs in the curvature of a sample of the projection depth point cloud map. The inflection point is generally located within a certain range near the reference point, and the inflection point of the sample of the projection depth point cloud map can be identified according to this feature. Furthermore, a straight line can be generated between the reference point and the preset position of the wear region, and the point on the projection depth point cloud map with the maximum distance from the straight line is an inflection point.

Figure 11:
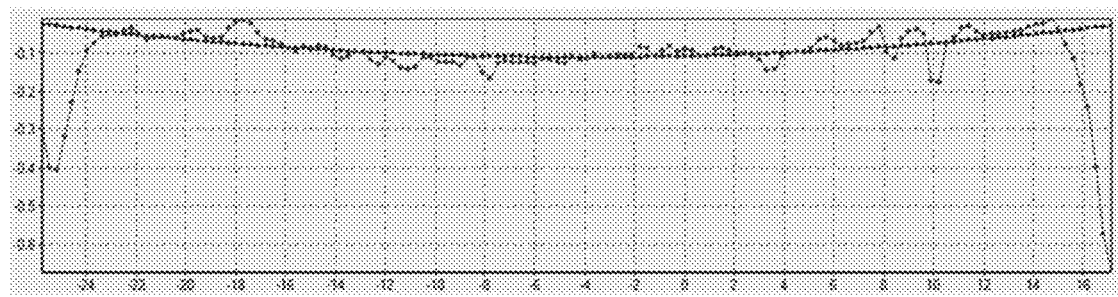

If the matching sample is the second-category sample, as shown in FIG. 11, the measurement point identification algorithm may be, for example: identifying an inflection point of a sample of the projection depth point cloud map, fitting a straight line near the inflection point according to a preset rule, and determining the measurement point according to the straight line fitted.

Figure 12:
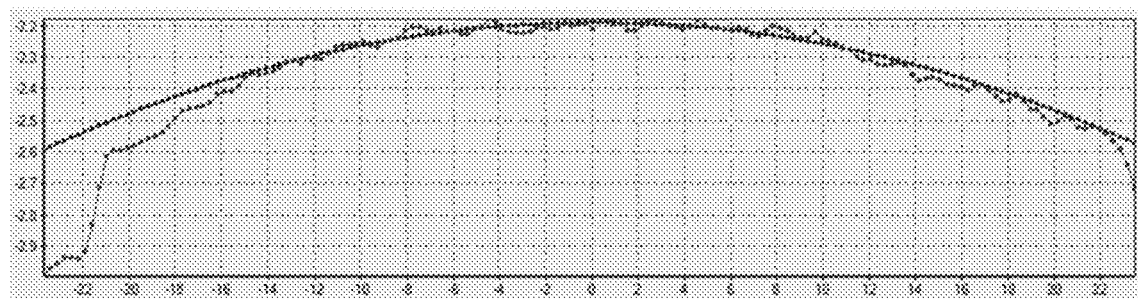

If the matching sample is the third-category sample, as shown in FIG. 12, the measurement point identification algorithm may be, for example: identifying an inflection point of a sample of the projection depth point cloud map, generating a measurement line according to point cloud data within a preset range on the right side of the inflection point, and determining the measurement point according to the generated measurement line.

Here, the measurement line may be generated from a point near the inflection point where the yL coordinate value is the largest, or from an average value of the yL coordinate values of the point cloud coordinates near the inflection point. In a preferred implementation mode, multiple point cloud coordinates near the inflection point can be selected, all the point cloud coordinates are sorted according to the size of the yL coordinate values, the point cloud coordinates whose yL coordinate values are in the top 50% are screened out, and a measurement line is generated according to the average value of the yL coordinate values of the top 50%/6 point cloud coordinates.

Figure 13:
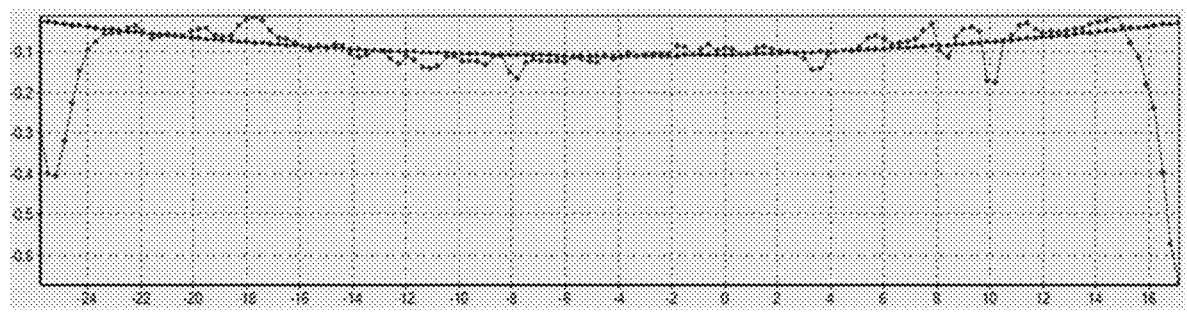
Figures 14, 15, 16:

If the matching sample is the fourth-category sample, as shown in FIGS. 13 and 14, the measurement point identification algorithm may be, for example: identifying an inflection point and the top point of a sample of the projection depth point cloud map, and determining a first preset position to the right side of the top point as the measurement point, wherein the top point is a coordinate point with the maximum laser projection depth.

If the matching sample is the fifth-category sample, as shown in FIG. 15, the measurement point identification algorithm may be, for example: identifying a change point and an inflection point of a sample of the projection depth point cloud map, and determining a second preset position near the change point as the measurement point, wherein the change point is a coordinate point in the wear region where the laser projection depth begins to change from large to small.

If the matching sample is the sixth-category sample, as shown in FIG. 16, the measurement point identification algorithm may be, for example: identifying an inflection point on the left side of a sample of the projection depth point cloud map, and determining the inflection point on the left side as the measurement point.

Step 154: determine the position of a measurement point in the projection depth point cloud map according to the measurement point identification algorithm of the projection depth point cloud map.

The measurement points are generally located above or below the projection depth point cloud map, and correspondingly, the reference points are generally located below or above the projection depth point cloud map. In the process of performing projection transformation on the pixel coordinate of the laser pattern to obtain a camera coordinate, according to different projection transformation modes, it can be that the reference point is below the projection depth point cloud map and the measurement point is above the projection depth point cloud map; it is also possible to perform 180° overturn on the point cloud data, namely, the reference point is above the projection depth point cloud map and the measurement point is below the projection depth point cloud map; the above projection transformation process is based on the principle of laser triangular ranging method.

Step 160, determine, according to the position of the reference point and the position of the measurement point, a difference value of the laser projection depths of the reference point and the measurement point, wherein the difference value is used for representing a wear degree index of a brake disc According to the position of the reference point and the position of the measurement point, the laser projection depth of the unworn region corresponding to the reference point and the laser projection depth of the wear region corresponding to the measurement point can be determined, so as to further determine the difference value between the laser projection depth of the unworn region and the laser projection depth of the wear region, and the difference value can be used for representing the wear degree index of the brake disc.

In a preferred implementation mode of an embodiment of the invention, the wear consistency of the brake disc may be determined on the basis of the variance of all point cloud coordinates of the wear region in the projection depth point cloud map and the wear region curvature of the projection depth point cloud map. The wear consistency may be used to represent a wear degree index of the brake disc. For example, the case where if the curvature of the wear region in the projection depth point cloud map is small and the variance is small, the wear consistency is relatively good; if the curvature of the wear region in the projection depth point cloud map is far greater than 0, then the wear at two ends is severe, the wear in the middle is small, and the wear consistency is not good; if the curvature of the projection depth point cloud map is far less than 0, then the middle wear is large, the wear at two ends is small, and the wear consistency is not good; if, in the wear region of the projection depth point cloud map, the middle curvature is small and the right curvature is large, then the middle wear consistency is relatively good and the right wear consistency is not good.

After acquiring a brake disc image containing a laser pattern, an embodiment of the present invention can extract the laser pattern from the brake disc image, and generate a projection depth point cloud map of the laser pattern according to the extracted laser pattern; further determine a matching sample matched with the projection depth point cloud map in the point cloud map identification model, determine the position of the reference point and the position of the measurement point in the projection depth point cloud map through the measurement feature of the matching sample, and according to the position of the reference point and the position of the measurement point, determine the difference values between the laser projection depths of the reference point and the measurement point, wherein the difference value is used for representing the wear degree index of the brake disc. It can be seen that an embodiment of the present invention can generate a projection depth point cloud map according to the brake disc image, and obtain a wear degree index of the brake disc according to the projection depth point cloud map, so that the wear degree of the brake disc can be accurately measured.

Figure 17:
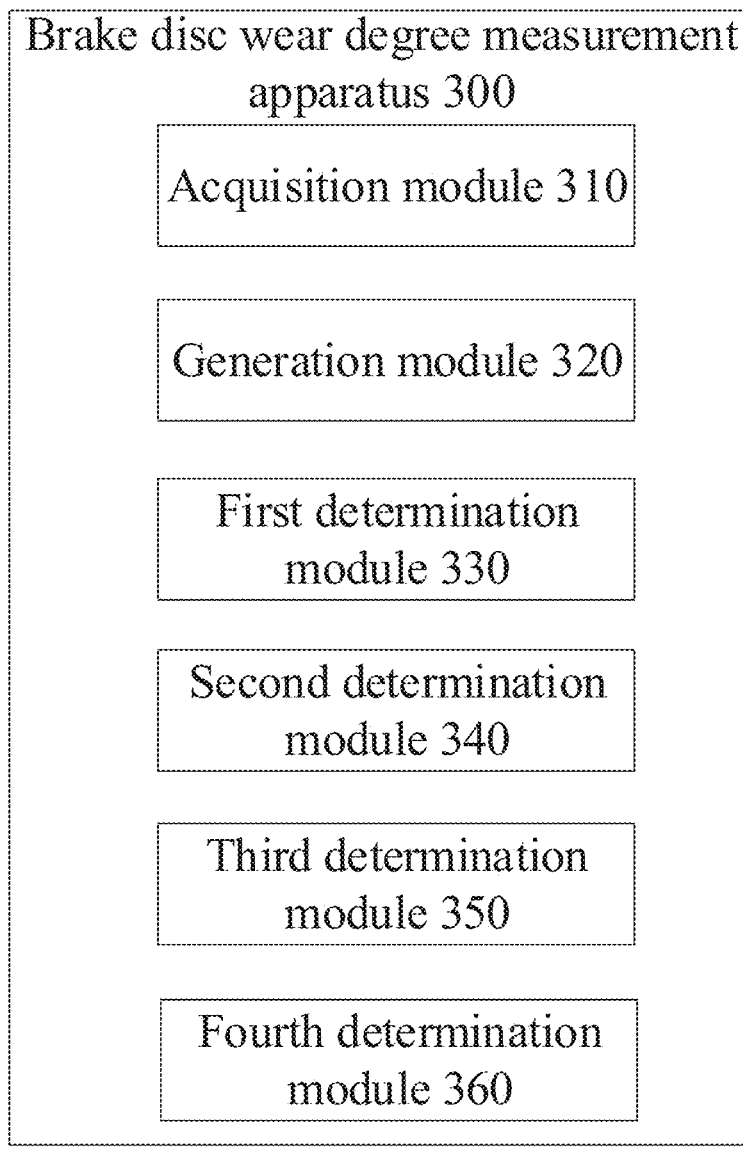
FIG. 17 shows a schematic structural diagram of a brake disc wear degree measurement apparatus provided by an embodiment of the present invention.

FIG. 17 shows a schematic structural diagram of an embodiment of a brake disc wear degree measurement apparatus according to the present invention. As shown in FIG. 17, the apparatus 300 includes: an acquisition module 310, a generation module 320, a first determination module 330, a second determination module 340, a third determination module 350, and a fourth determination module 360.

The acquisition module 310 is used for obtaining a brake disc image comprising a laser pattern:

the acquisition module 310 may also send a control command to a laser before obtaining a brake disc image comprising a laser pattern so that the laser projects laser light to the brake disc according to the control command, wherein after the laser light is projected onto the brake disc, the brake disc presents the laser pattern;

the generation module 320 is used for extracting the laser pattern from the brake disc image, and generating a projection depth point cloud map of the laser pattern according to the extracted laser pattern;

the first determination module 330 is used for identifying the projection depth point cloud map by means of a point cloud map identification model to obtain a matching sample, which matches the projection depth point cloud map, in the point cloud map identification model, and determining a measurement feature of the matching sample as a measurement feature of the projection depth point cloud map, wherein the measurement feature comprises at least one of a position feature of an interference pattern and an image feature related to a measurement position;

the second determination module 340 is used for determining a position of a reference point in the projection depth point cloud map according to the measurement feature, wherein the reference point is located in an unworn region, and the reference point is used as an identification point of the laser projection depth of the unworn region;

the third determination module 350 is used for determining a position of a measurement point in the projection depth point cloud map according to the measurement feature, wherein the measurement point is located in a wear region, and the measurement point is used as an identification point of the laser projection depth of the wear region;

the fourth determination module 360 is used for determining, according to the position of the reference point and the position of the measurement point, a difference value of the laser projection depths of the reference point and the measurement point, wherein the difference value is used as an index for representing the wear degree of the brake disc.

In an alternative mode, the second determination module 340 is further used for:

identifying a coordinate point with the minimum laser projection depth in the projection depth point cloud map according to the measurement feature; and determining the identified coordinate point with the minimum laser projection depth as a reference point of the projection depth point cloud map.

In an alternative mode, the second determination module 350 is further used for:

determining a measurement point identification algorithm of the projection depth point cloud map according to the category of the matching sample; and determining the position of a measurement point in the projection depth point cloud map according to the measurement point identification algorithm of the projection depth point cloud map.

In an alternative mode, the first determination module 330 is used for:

acquiring multiple samples of the projection depth point cloud map and a category label for each sample of the projection depth point cloud map; and inputting the multiple samples of the projection depth point cloud map and the category label of each sample of the projection depth point cloud map into a neural network model for training to generate the point cloud map identification model.

In an alternative mode, if the matching sample is the first-category sample, the third determination module 350 is used for: identifying an inflection point of a sample of the projection depth point cloud map, and determining the inflection point as the measurement point;

if the matching sample is the second-category sample, the third determination module 350 is used for: identifying the inflection point of a sample of the projection depth point cloud map, fitting a straight line near the inflection point according to a preset rule, and determining the measurement point according to the straight line fitted;

if the matching sample is the third-category sample, the third determination module 350 is used for: identifying the inflection point of a sample of the projection depth point cloud map, generating a measurement line according to point cloud data within a preset range on the right side of the inflection point, and determining the measurement point according to the generated measurement line;

if the matching sample is the fourth-category sample, the third determination module 350 is used for: identifying an inflection point and the top point of a sample of the projection depth point cloud map, and determining a first preset position to the right side of the top point as the measurement point, wherein the top point is a coordinate point with the maximum laser projection depth;

if the matching sample is the fifth-category sample, the third determination module 350 is used for: identifying a change point and an inflection point of a sample of the projection depth point cloud map, and determining a second preset position near the change point as the measurement point, wherein the change point is a coordinate point in the wear region where the laser projection depth begins to change from large to small;

if the matching sample is the sixth-category sample, the third determination module 350 is used for: identifying an inflection point on the left side of a sample of the projection depth point cloud map, and determining the inflection point on the left side as the measurement point;

the inflection point is a coordinate point at a position where a preset change occurs in the curvature of a sample of the projection depth point cloud map.

In an alternative mode, the interference pattern comprises a virtual region, the virtual region being an abnormal region on the projection depth point cloud map. The apparatus 300 further comprises a preprocessing module, wherein the preprocessing module is used for:

detecting whether a virtual region exists in the projection depth point cloud map according to the measurement feature;

wherein if it is detected that there is a virtual region, a preset replacement algorithm is used to replace a coordinate value of the virtual region, so that there is no virtual region on the replaced projection depth point cloud map.

In an alternative mode, the image feature relating to the measurement position includes inclinations. A pre-processing module is used for:

detecting whether the projection depth point cloud map is inclined according to the measurement feature;

wherein if it is detected that the projection depth point cloud map is inclined, rotation transformation is performed on the projection depth point cloud map so that the projection depth point cloud map which has undergone the rotation transformation is no longer inclined.

In an alternative mode, the interference pattern comprises a background region, wherein the background region is a region where point cloud data of the background outside the brake disc is located. A pre-processing module is used for:

detecting whether a background region exists in the projection depth point cloud map according to the measurement feature;

wherein if it is detected that a background region exists in the projection depth point cloud map, a preset filtering algorithm is used to filter the background region so as to eliminate the interference of the background region.

In an alternative mode, the interference pattern comprises a framework region, wherein the framework region is a region where point cloud data of the framework of the brake disc is located on the projection depth point cloud map. A pre-processing module is used for:

identifying the framework region in the projection depth point cloud map according to the measurement feature.

In an alternative mode, the second determination module 340 is used for:

performing a point cloud consistency analysis on the projection depth point cloud map according to the measurement feature to determine the position of the reference point in the projection depth point cloud map, wherein the projection depth point cloud map corresponds to one wear edge of the brake disc, and the point cloud consistency analysis comprises a discreteness analysis of a coordinate point set of a wear region and curvature analysis of the projection depth point cloud map.

In an alternative mode, the apparatus 300 further comprises a fifth determination module. The fifth determination module is used for:

determining wear consistency of the brake disc based on a variance of all point cloud coordinates of a wear region in the projection depth point cloud map and a wear region curvature of the projection depth point cloud map, wherein the wear consistency is used for representing a wear degree index of the brake disc.

According to the embodiments of the present invention, after an acquisition module acquires a brake disc image containing a laser pattern, a generation module can extract the laser pattern from the brake disc image and generate a projection depth point cloud map of the laser pattern according to the extracted laser pattern; the first determination module can determine a matching sample matched with the projection depth point cloud map in the point cloud map identification model; the position of a reference point in the projection depth point cloud map can be determined by the second determination module according to the measurement feature of the matching sample; the position of a measurement point in the projection depth point cloud map can be determined by the third determination module according to the measurement feature of the matching sample; the difference value between the laser projection depths of the reference point and the measurement point can be determined by the fourth determination module according to the position of the reference point and the position of the measurement point, wherein the difference value is used for representing the wear degree index of the brake disc. It can be seen that an embodiment of the present invention can generate a projection depth point cloud map according to the brake disc image, and obtain a wear degree index of the brake disc according to the projection depth point cloud map, so that the wear degree of the brake disc can be accurately measured.

An embodiment of the present invention provides a computer-readable storage medium storing thereon at least one executable instruction that, when running on a brake disc wear measurement device, causes the brake disc wear measurement device to execute a brake disc wear degree measurement method in any of the method embodiments described above.

An embodiment of the present invention provides a brake disc wear degree measurement apparatus for executing the brake disc wear degree measurement method described above.

An embodiment of the present invention provides a computer program that can be invoked by a processor to cause a brake disc wear degree measurement device to execute the brake disc wear degree measurement method of any of the method embodiments described above.

An embodiment of the disclosure provides a computer program product including a computer program stored on a computer-readable storage medium. The computer program includes program instructions which, when running on a computer, cause the computer to execute the brake disc wear degree measurement method of any of the method embodiments described above.

The algorithm or display provided herein is not inherently related to any particular computer, virtual system, or other devices. Various general-purpose systems may also be used with the teachings based on what is disclosed herein. According to the above description, the structure required to construct such a system is obvious. Furthermore, embodiments of the present invention are not directed to any particular programming language. It should be understood that the contents of the invention described herein can be realized by using various programming languages, and the description of the specific language is to disclose the best implementation mode of the invention.

In the description provided herein, numerous specific details are set forth. However, it could be understood that embodiments of the invention may be practiced without these specific details. In some instances, well-known methods, structures, and techniques have not been shown in detail in order not to obscure the understanding of this description.

Similarly, it should be understood that in the above description of example embodiments of the invention, various features of the embodiments of the invention are sometimes grouped together in a single embodiment, figure, or the description thereof for the purpose of streamlining the invention and aiding in the understanding of one or more of the various inventive aspects. However, the disclosed method should not be interpreted as reflecting the intention that the claimed invention requires more features than those clearly recorded in each claim.

It could be understood by those skilled in the art that the modules in the devices in the embodiments may be changed adaptively and arranged in one or more devices different from the embodiment. Modules or units or assemblies in an embodiment may be combined into one module or unit or assembly and may be divided into multiple sub-modules or sub-units or sub-assemblies. Except that at least some of such features and/or processes or units are mutually exclusive, all features disclosed in the description (including accompanying claims, abstract, and drawings) and all processes or units of any method or device so disclosed can be combined in any combination. Each feature disclosed in the description (including any accompanying claims, abstract, and drawings) may be replaced by alternative features serving the same, equivalent, or similar purpose, unless expressly stated otherwise.

It should be noted that the above-mentioned embodiments illustrate rather than limit the invention, and that those skilled in the art can design alternative embodiments without departing from the scope of the appended claims. In the claims, any reference sign placed in a bracket shall not be construed as limiting the claims. The word "comprising" does not exclude the presence of an element or a step other than those listed in a claim. The word "a" or "one" preceding an element does not exclude the presence of multiple such elements. The present invention can be implemented by means of hardware comprising several distinct elements, and by means of a suitably programmed computer. In a unit claim enumerating several devices, several devices of these devices can be specifically embodied by one and the same item of hardware. The use of the words first, second, third, etc. does not denote any order. These words may be interpreted as names. The steps in the above embodiments are not to be construed as limiting the order of execution unless otherwise specified.

The invention claimed is:

1. A brake disc wear degree measurement method, wherein the method comprises:
   obtaining a brake disc image comprising a laser pattern;
   extracting the laser pattern from the brake disc image, and generating a projection depth point cloud map of the laser pattern according to extracted laser pattern;
   identifying the projection depth point cloud map by means of a point cloud map identification model to obtain a matching sample, which matches the projection depth point cloud map, in the point cloud map identification model, and determining a measurement feature of the matching sample as the measurement feature of the projection depth point cloud map, wherein the measurement feature comprises at least one of a position feature of an interference pattern and an image feature related to a measurement position;
   determining a position of a reference point in the projection depth point cloud map according to the measurement feature, wherein the reference point is located in an unworn region, and the reference point is used as an identification point of a laser projection depth of the unworn region;
   determining a position of a measurement point in the projection depth point cloud map according to the measurement feature, wherein the measurement point is located in a wear region, and the measurement point is used as an identification point of the laser projection depth of the wear region; and
   determining, according to the position of the reference point and the position of the measurement point, a difference value of the laser projection depths of the reference point and the measurement point, wherein the difference value is used for representing a wear degree index of the brake disc.

2. The method according to claim 1, wherein the determining a position of a reference point in the projection depth point cloud map according to the measurement feature comprises:
   identifying a coordinate point with a minimum laser projection depth in the projection depth point cloud map according to the measurement feature; and
   determining identified coordinate point with the minimum laser projection depth as the reference point of the projection depth point cloud map.

3. The method according to claim 1, wherein the determining a position of a measurement point in the projection depth point cloud map according to the measurement feature further comprises:
   determining a measurement point identification algorithm of the projection depth point cloud map according to a category of the matching sample; and
   determining the position of a measurement point in the projection depth point cloud map according to the measurement point identification algorithm of the projection depth point cloud map.

4. The method according to claim 1, wherein the point cloud map identification model is generated in a following way:
   acquiring multiple samples of the projection depth point cloud map and a category label for each sample of the projection depth point cloud map; and
   inputting the multiple samples of the projection depth point cloud map and the category label of each sample of the projection depth point cloud map into a neural network model for training to generate the point cloud map identification model.

5. The method according to claim 3, wherein the method comprises:
   if the matching sample is a first-category sample, then the measurement point identification algorithm being: identifying an inflection point of a sample of the projection depth point cloud map, and determining the inflection point as the measurement point;
   if the matching sample is a second-category sample, then the measurement point identification algorithm being: identifying the inflection point of a sample of the projection depth point cloud map, fitting a straight line near the inflection point according to a preset rule, and determining the measurement point according to fitted straight line;
   if the matching sample is a third-category sample, then the measurement point identification algorithm being: identifying the inflection point of a sample of the projection depth point cloud map, generating a measurement line according to point cloud data within a preset range on a right side of the inflection point, and determining the measurement point according to generated measurement line;
   if the matching sample is a fourth-category sample, then the measurement point identification algorithm being: identifying the inflection point and a top point of a sample of the projection depth point cloud map, and determining a first preset position on the right side of the top point as the measurement point, wherein the top point is a coordinate point with a maximum laser projection depth;
   if the matching sample is a fifth-category sample, then the measurement point identification algorithm being: identifying a change point and the inflection point of a sample of the projection depth point cloud map, and determining a second preset position near the change point as the measurement point, wherein the change point is a coordinate point where the laser projection depth begins to change from large to small in the wear region; and
   if the matching sample is a sixth-category sample, then the measurement point identification algorithm being: identifying the inflection point on a left side of a sample of the projection depth point cloud map, and determining the inflection point on the left side as the measurement point;
   wherein the inflection point is a coordinate point at a position where a preset change occurs in curvature of a sample of the projection depth point cloud map.

6. The method according to claim 1, wherein the interference pattern comprises a virtual region, the virtual region being an abnormal region on the projection depth point cloud map, and after a step of determining the measurement feature of the matching sample as the measurement feature of the projection depth point cloud map, the method further comprises:
   detecting whether the virtual region exists in the projection depth point cloud map according to the measurement feature; wherein
   if it is detected that the virtual region exists, a preset replacement algorithm is used to replace a coordinate value of the virtual region, so that the virtual region does not exist on the projection depth point cloud map after a replacement, and then steps of determining a position of a reference point in the projection depth point cloud map according to the measurement feature and determining a position of a measurement point in the projection depth point cloud map according to the measurement feature are executed.

7. The method according to claim 1, wherein the image feature relating to measurement position comprises an inclination, and after a step of determining a measurement feature of the matching sample as a measurement feature of the projection depth point cloud map, the method further comprises:
    detecting whether the projection depth point cloud map is inclined according to the measurement feature;
    wherein if it is detected that the projection depth point cloud map is inclined, a rotation transformation is performed on the projection depth point cloud map so that the projection depth point cloud map which has undergone the rotation transformation is no longer inclined, and then steps of determining a position of a reference point in the projection depth point cloud map according to the measurement feature and determining a position of a measurement point in the projection depth point cloud map according to the measurement feature are executed.

8. The method according to claim 1, wherein the interference pattern comprises a background region, the background region being a region where point cloud data of a background outside the brake disc is located, and after a step of determining a measurement feature of the matching sample as the measurement feature of the projection depth point cloud map, the method further comprises:
    detecting whether a background region exists in the projection depth point cloud map according to the measurement feature;
    wherein if it is detected that a background region exists in the projection depth point cloud map, a preset filtering algorithm is used to filter the background region so as to eliminate an interference of the background region, and then steps of determining a position of a reference point in the projection depth point cloud map according to the measurement feature and determining a position of a measurement point in the projection depth point cloud map according to the measurement feature are executed.

9. The method according to claim 1, wherein the interference pattern comprises a framework region, the framework region being a region where point cloud data of a framework of the brake disc is located on the projection depth point cloud map, and after a step of determining a measurement feature of the matching sample as the measurement feature of the projection depth point cloud map, the method further comprises:
    identifying the framework region in the projection depth point cloud map according to the measurement feature, and then executing steps of determining a position of a reference point in the projection depth point cloud map according to the measurement feature and determining a position of a measurement point in the projection depth point cloud map according to the measurement feature.

10. The method according to claim 1, wherein the determining a position of a reference point in the projection depth point cloud map according to the measurement feature comprises:
    performing a point cloud consistency analysis on the projection depth point cloud map according to the measurement feature to determine the position of the reference point in the projection depth point cloud map, wherein the projection depth point cloud map corresponds to one wear edge of the brake disc, and the point cloud consistency analysis comprises a discreteness analysis of a coordinate point set of a wear region and curvature analysis of the projection depth point cloud map.

11. The method according to claim 1, wherein the method further comprises:
    determining wear consistency of the brake disc based on a variance of all point cloud coordinates of a wear region in the projection depth point cloud map and a wear region curvature of the projection depth point cloud map, wherein the wear consistency is used for representing a wear degree index of the brake disc.

12. A brake disc wear degree measurement device, comprising: a laser, a camera, and a host; wherein
    the laser is used for projecting laser light to a brake disc;
    the camera is used for acquiring a brake disc image containing a laser pattern, wherein after the laser light is projected onto the brake disc, the brake disc presents the laser pattern;
    the host is used for executing the brake disc wear degree measurement method according to claim 1.

13. A computer-readable storage medium, wherein at least one executable instruction is stored in the storage medium, and when the executable instruction runs on a brake disc wear degree measurement device, the brake disc wear degree measurement device executes an operation of the brake disc wear degree measurement method according to claim 1.

* * * * *